United States Patent

Strid et al.

[11] Patent Number: 5,151,176
[45] Date of Patent: Sep. 29, 1992

[54] FILTER FOR CONTINUOUS FILTRATION

[76] Inventors: Kent Strid, Svadenvägen 11, S-810 28 Järbo; Hans Å. Karlsson, Slånstigen 8, S-776 00 Hedemora; Per Larsson, Gimlestigen 15, S-774 00 Avesta, all of Sweden

[21] Appl. No.: 655,395
[22] PCT Filed: Jun. 13, 1990
[86] PCT No.: PCT/SE90/00413
    § 371 Date: Apr. 15, 1991
    § 102(e) Date: Apr. 15, 1991
[87] PCT Pub. No.: WO90/15655
    PCT Pub. Date: Dec. 27, 1990

[30] Foreign Application Priority Data
    Jun. 14, 1989 [SE] Sweden .................. 8902147

[51] Int. Cl.⁵ ............................ B01D 33/25
[52] U.S. Cl. ..................... 210/178; 210/180;
    210/181; 210/187; 210/210; 210/218; 210/259;
    55/267
[58] Field of Search ............... 210/175, 176, 177, 178,
    210/179, 180, 181, 182, 187, 210, 218, 252, 253,
    258, 259, 260; 55/20, 28, 76, 78, 267, 270, 316

[56] References Cited
    U.S. PATENT DOCUMENTS
    4,120,787 10/1978 Yargeau ................. 210/180
    4,775,484 10/1988 Schmidt et al. ......... 210/181
    4,931,176 6/1990 Guinara ................ 210/182

Primary Examiner—Robert A. Dawson
Assistant Examiner—W. L. Millard
Attorney, Agent, or Firm—Pollock Vande Sande & Priddy

[57] ABSTRACT

A filter for continuous filtration of a liquid includes conventionally a vessel having a center shaft on which is arranged at least one rotating filter element defining an inner space for liquid obtained at filtration. Further there is provided a washing device for washing of material deposited on the filter element, a connection between said inner space and outlet means from said vessel and a separator connected to said outlet and adapted for separating filtrate and gas. Means is provided outside said vessel for generating an overpressure in the gas space of the vessel and a lower pressure in the interior of the filter element at least corresponding to the evaporating temperature of the filtrated liquid for evaporation of the liquid in the separator. The separator is provided with a cooling device for cooling the separated gas and an outlet for condensate obtained at cooling.

8 Claims, 3 Drawing Sheets

FILTER FOR CONTINUOUS FILTRATION

FIELD OF THE INVENTION

The present invention concerns a filter for continuous filtration of a liquid by means of at least one filter element particularly but not exclusively adapted to be used as a filter in a causticizing process.

Similarly to prior art filters, a filter according to the present invention includes a vessel containing the liquid to be filtered and gas in a space located above the liquid level, at least one rotatable filter element provided in the vessel and defining an inner space for filtrated liquid obtained by the filtration, a device for washing material separated from the liquid and deposited on the filter element, communication between said inner space of the filter element and an outlet from said vessel, and a separator connected to said outlet for separating the filtrated liquid and gas entrained therewith.

SUMMARY OF THE INVENTION

As distinguished from prior art filters a filter, according to the present invention is characterized in that for to provide the pressure differential necessary for filtration between the gas space of the vessel and the inner space of the filter element, means are provided outside the vessel for generating an overpressure in the gas space of the vessel and a lower pressure in the inner space of the filter element at least corresponding to the evaporation temperature of the filtrated liquid in order to keep the filtrated liquid in the state of evaporation in the separator, and in that the separator is provided with a device for cooling of the separated gas and with outlet means for discharging condensate obtained upon cooling.

According to the present invention, by providing said means for pressurizing and said separator with said cooling device and said outlet means for condensate a number of advantages are obtained. Thus, a higher concentration of filtrated liquid (filtrate) is produced because a substantial part of the washing liquid (water) supplied for the above-mentioned washing, which would otherwise dilute the filtrated liquid, is withdrawn by the condensation. Further, an improved separation of condensate and gas vapor is obtained, so that a smaller amount of gas has to be added to the filter system, which in turn reduces the risk of oxidation in the system of the medium passing through the filter system. In certain cases, condensate can be recycled to the washing device in which case it would not be necessary to supply washing liquid and this may also result in a simplified structure. Further, a greater capacity is produced because in a higher revolutionary speed of the filter element is possible.

In summary, the principal advantages of the present invention are optimum expulsion of gas from the filtrated liquid and also an optimum expelling of washing liquid.

One embodiment of the present invention also comprises a conduit between the gas space of the separator and the gas space of the vessel for recirculating gas to the gas space of the vessel, said gas conduit comprising said means for generating said overpressure and said lower pressure. This results in a simple embodiment for obtaining said overpressure and said lower pressure, and also a simple provision for mutal adaption, especially when in a development of this embodiment said pressure generating means is divided into at least two pressure generating means separated along the gas conduit, at least said means provided closest to the separator generating said lower pressure in said space within said filter element and a subsequent means increasing the pressure for obtaining the overpressure existing in the gas space of the vessel. In this last mentioned embodiment, prevailing atmospheric pressure may be preferably be at a point between said pressure generating means for obtaining said lower pressure and said overpressure, respectively. The higher concentration of filtrated liquid is also caused by a preferred embodiment wherein the filter element comprises at least one disc element mounted on a substantially horizontal shaft, and wherein said washing device is arranged for washing only of a zone the disc element located closest to the shaft substantially concentric relative thereto, and wherein said lower pressure at least substantially solely prevails over said washing zone.

In a further preferred embodiment of the present invention, the washing device is divided into at least two separate washing means for washing in at least two steps, whereby occurs an advantageous stirring of the material deposited on the outside of the filter element at the washing in the second step involving a better filtration than in prior art structures having only one washing means.

BRIEF DESCRIPTION OF THE DRAWINGS

The above mentioned and other advantages of the present invention will be apparent from the following description of embodiments of filters according to the present invention, reference being made to the annexed drawings, wherein FIGS. 1-4 schematically show front elevations of four embodiments of the filters according to the invention.

DETAILED DESCRIPTION

Figure 3:
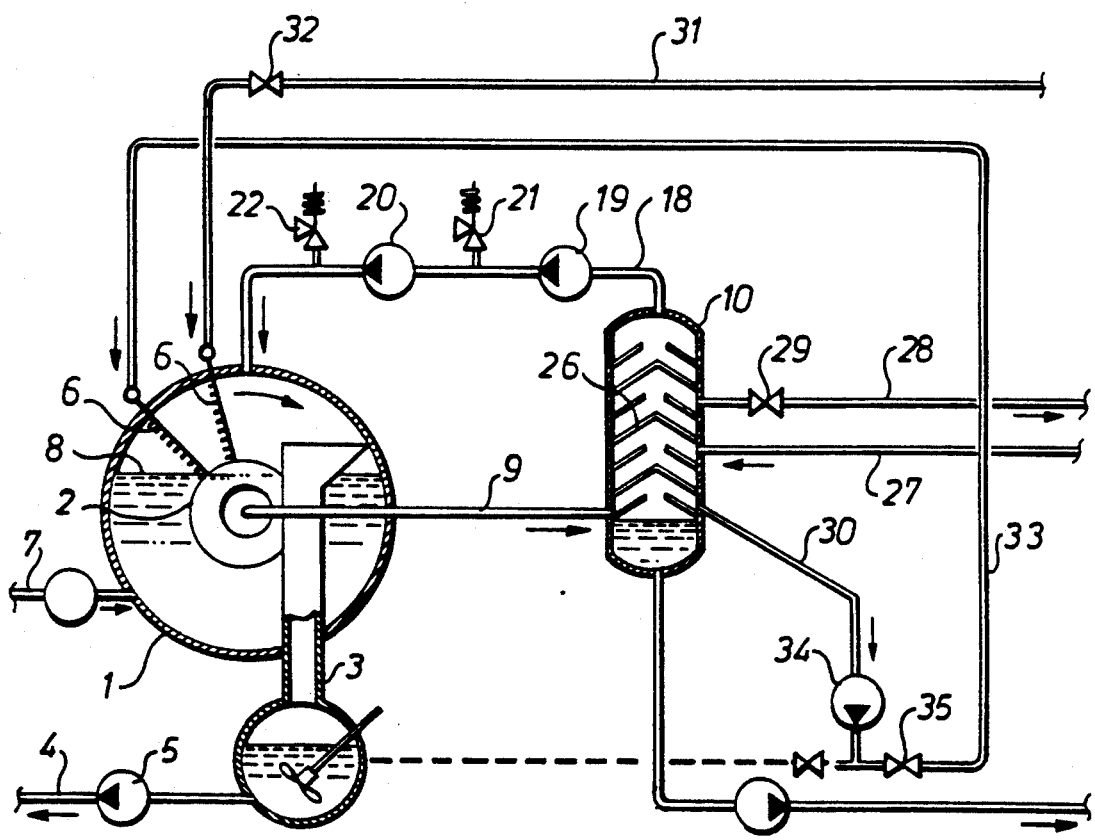
Figure 4:
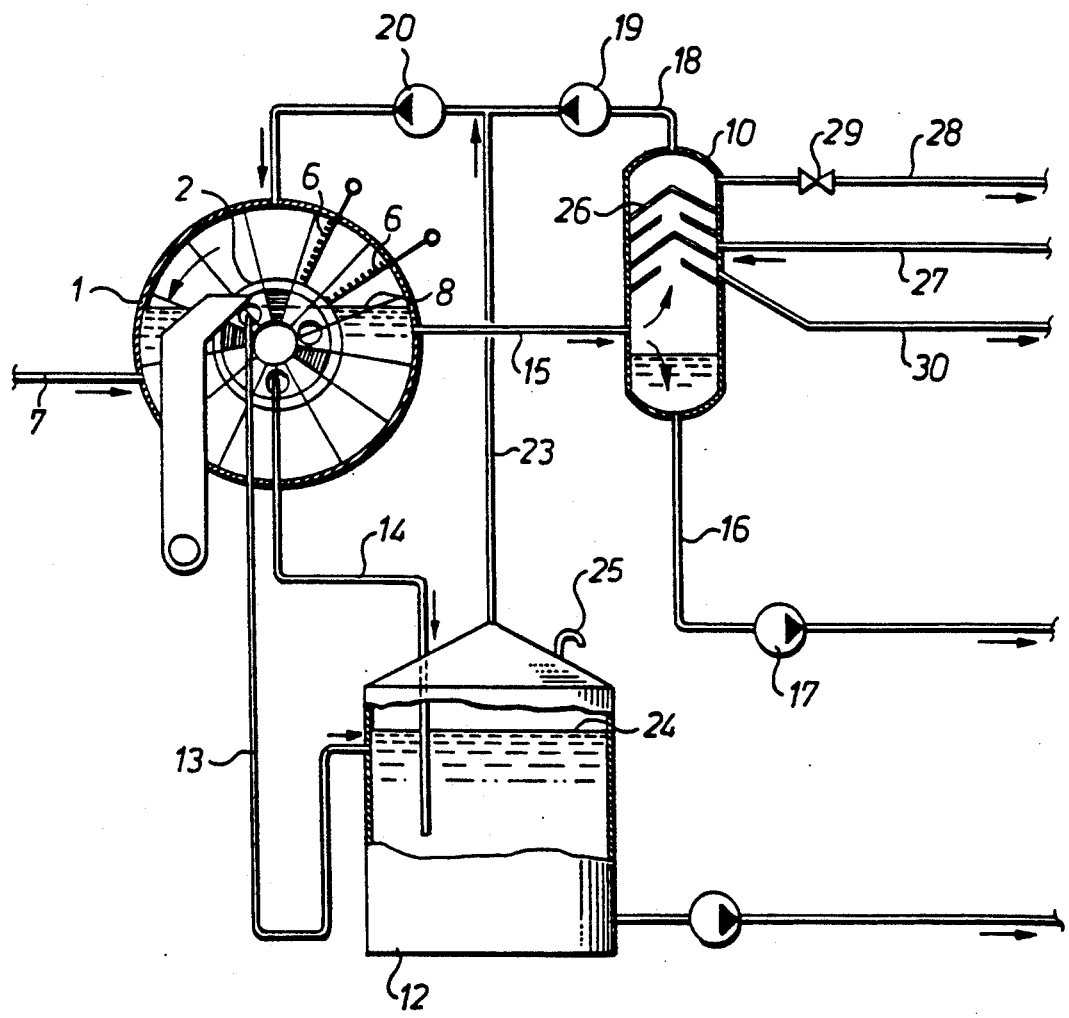

The filters shown in the drawings are so-called disc filters, which conventionally include like a substantially cylindrical vessel 1, a center shaft 2 rotatably journalled in the vessel and a number of filter discs (not shown) arranged on the center shaft spaced from from each other, as shown e.g. in U.S. Pat. No. 4,695,381. Each filter disc is composed of a number of disc sectors (not shown), for as shown in the said U.S. Pat. No. 4,695,381, said filter sectors in a conventional manner being composed of surrounding filter cloth and internal channels and being connected to the center shaft for discharging therethrough filtrate and gas resulting from the filtration. The center shaft may be formed with a number of axial channels, one channel for each filter sector, as described and shown in the above-mentioned Patent, or may comprise a single channel for filtrate and gas from all filter sectors of the pressure vessel, as shown in published PCT Application PCT/SE90/00413 (WO/90/10490). Further as also shown in the latter, the filters may include a removing device or scraper for removal of filter cake deposited on the filter cloth during filtration and a device for removing filter cake material from the cloth located inside scraped off material, so-called precoat layer. As shown, e.g., in FIGS. 1 and 3, the filters further comprise a device 3 for receiving the scraped-off filter cake material and discharging it through the conduit 4 by means of a pump 5, and, as shown in FIGS. 3 and 4, a device 6 for washing of the filter cloth. Further, the filter vessel has an inlet 7 for supplying the liquid to be filtrated and to keep the liquid at a certain level 8 in the vessel.

Figure 1:
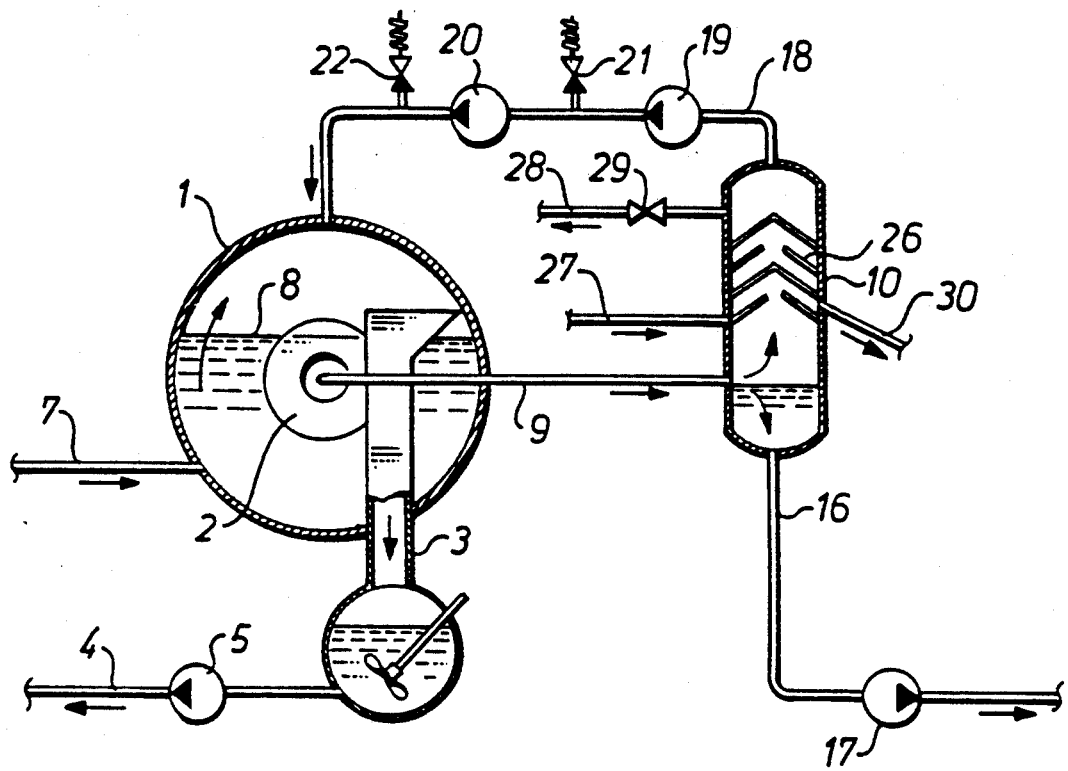
Figure 2:
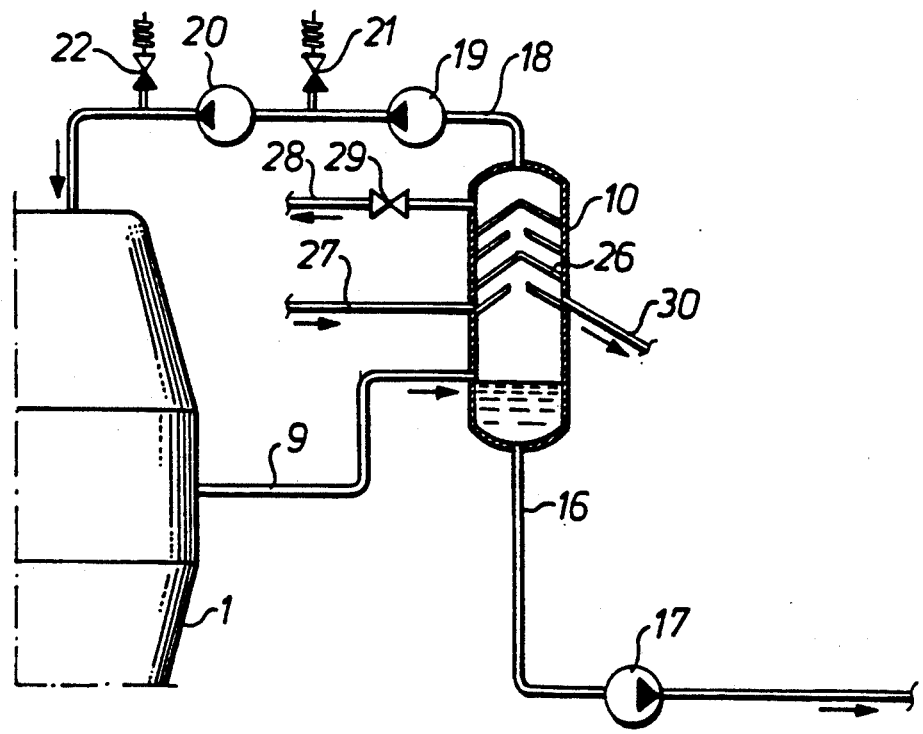

As shown in FIGS. 1-3, filtrate and gas obtained upon filtration are discharged through a conduit 9 to a separator 10. In the embodiment according to FIG. 4 intermediate walls are arranged in the center shaft 2 is in order to obtain on the one hand a prefiltrate when the filter discs pass through the liquid, said prefiltrate being discharged to a filtrate tank 12 through a conduit 13, and on the other hand a clear filtrate discharged to said filtrate tank through conduit 14, and, when the filter discs pass through the space above the liquid level filtrate, washing liquid and gas discharged through conduit 15 to the separator 10. In the separator 10, filtrate and gas are separated, the filtrate being discharged through conduit 16 by means of pump 17 and the gas being recirculated through conduit 18 to the vessel 1.

In the gas conduit 18 are arranged two blowers 19 and 20, blower 19 being adapted to generate a lower pressure in the interior of the filter discs and the blower 20 being adapted to generate an overpressure in the gas space of vessel 1 above the liquid level 8. These blowers 19, 20 constitute examples of means for obtaining the pressure differential necessary for filtration between the gas space of the vessel and the interior of the filter discs by an overpressure in the gas space of the vessel and a lower pressure in the interior of the filter discs. Hereby is created a filter having advantages obtained only in a pressure filter as well as advantages obtained only in, for instance, a vacuum filter. Hereby is obtained, for instance, substantial conversion and cleaning of gas circulating in the filter system. Further, in comparison to pressure filters, a substantially cheaper filtration vessel can be utilized. The invention further permits the use of simpler and cheaper means for generating overpressure and underpressure, respectively, than in to prior art known pressure and vacuum filters, respectively. Also a faster pressurizing of the filter is acheived.

As appears from FIGS. 1-3, a valve 21 is located between the blowers 19 and 20, and after the blower 20 a valve 22 downstream of blower 20. The valve 21 is adapted to provide a pressure of substantially zero between the blowers, and the valve 22 is adapted to prevent an excessive pressure in the gas space of vessel 1. In the embodiment of FIG. 4, a conduit 23 leads from a point between blowers 19 and 20 to the space of the filtrate tank 12 above its liquid level 24, said space being vented to the surrounding atmosphere through conduit 25. Overpressure and lower pressure can be varied in adapted to a given filtration situation. The lower pressure is adapted to the temperature of the filtrate in the separator 10 in order to produce an optimum boiling effect of the liquid. The overpressure is adapted to the lower pressure, such that a pressure differential over the filter element necessary and suitable for filtration is obtained. For instance, in the case of white liquor filtration, the pressure differential may be 1.0 bar, the overpressure in the gas space of vessel 1 then may be between 0.1 and 0.9 bar and the lower pressure in the interior of the filter discs between 0.9 and 0.1 bar.

As shown in the drawings figures, the separator 10 is provided with a cooling device 26, in this embodiment a device cooled by cooling water, introduced through conduit 27 and discharged through conduit 28 provided with valve 29. The condensate obtained by cooling is discharged through conduit 30.

Another significant feature of a filter according to the present invention is shown in FIGS. 3 and 4, and This novelty comprises an improved washing device referred to in 6 divided into at least two separate washing means, e.g., spraying tubes, for washing in at least two steps. The second washing step produces stirring of the material deposited on the outside of the filter discs, improves filtration over prior art devices having only one washing means. As also appears from FIGS. 3 and 4, the location of the washing means 6, as well as the location of the device 3 for receiving the scraped-off filter cake material, depends on the rotational direction of the filter discs. Washing liquid for the washing means can either be supplied from outside, for instance as shown, only to the first washing means 6, through conduit 31 having a valve 32, or condensate from the separator 10 may be supplied to a washing means, for instance as shown, through conduit 33 to the second washing means 6, in this case a pump 34 being inserted in condensate conduit 30 and a valve 35 being inserted in conduit 33.

While the invention has been described and illustrated in connection with disc filters, it may also be used with drum filters, i.e., a filter element in the shape of a rotating drum having a surrounding filter cloth.

I claim:

1. A filter for continuous filtration of a liquid under pressure, said filter including a vessel containing said liquid to a certain level and gas in a gas space located above said liquid, at least one rotatable filter element provided in said vessel and defining an inner space for filtrated liquid obtained by filtration, a washing device for washing material separated from said liquid and deposited on said filter element, communication between said inner space of said filter element and outlet means from said vessel for discharging said filtrated liquid and gas entrained therewith, and a separator connected to said outlet for separating said filtrated liquid from entrained gas, means being provided outside said vessel for generating overpressure in said gas space of said vessel and a lower pressure in said inner space of said filter element at least corresponding to an evaporation temperature of said filtrated liquid in order to maintain said filtrated liquid in a state of evaporation within said separator, said separator being provided with a cooling device for cooling the separated gas and with outlet means for discharging condensate obtained upon cooling.

2. A filter according to claim 1, comprising a gas conduit disposed between a gas space of said separator and said gas space of said vessel for recirculating gas to said gas space of said vessel, said means for generating said overpressure and said lower pressure being arranged in said gas conduit.

3. A filter according to claim 2, wherein said pressure generating means comprises at least two pressure generating means located in said gas conduit, at least one of said pressure generating means being arranged closest to said separator and generating said lower pressure in said inner space of said filter element, and a subsequent one of said pressure generating means increasing the pressure for obtaining said overpressure prevailing in said gas space of said vessel.

4. A filter according to claim 3, comprising pressure regulating means disposed in said gas conduit and adapted to maintain atmospheric pressure in said gas conduit between said pressure generating means for obtaining said lower pressure and said overpressure, respectively.

5. A filter according to claim 1, wherein said filter element comprises at least one disc filter mounted on a substantially horizontal shaft, said washing device being adapted for washing only one washing zone of said disc filter located closest to said shaft and substantially concentric therewith, said lower pressure prevailing at least substantially over said washing zone.

6. A filter according to claim 1, wherein said washing device comprises at least two separate washing means for washing in at least two steps.

7. A filter according to claim 1, wherein at least a part of the condensate obtained by cooling in said separator is recirculated to said washing device.

8. A filter according to claim 1, wherein said pressure generating means comprises blowers.

* * * * *